United States Patent
Sinha (10) Patent No.: US 11,554,550 B2
(45) Date of Patent: Jan. 17, 2023

(54) METHODS FOR FORMING STRENGTHENED ADDITIVE MANUFACTURING MATERIALS AND STRENGTHENED FILAMENTS FOR USE

(71) Applicant: The Boeing Company, Chicago, IL (US)

(72) Inventor: Nishant K. Sinha, Chicago, IL (US)

(73) Assignee: The Boeing Company, Chicago, IL (US)

( * ) Notice: Subject to any disclaimer, the term of this patent is extended or adjusted under 35 U.S.C. 154(b) by 377 days.

(21) Appl. No.: 16/700,302

(22) Filed: Dec. 2, 2019

(65) Prior Publication Data

US 2021/0162673 A1 Jun. 3, 2021

(51) Int. Cl.
| | |
|---|---|
| *B29C 64/314* | (2017.01) |
| *B33Y 10/00* | (2015.01) |
| *B29C 64/153* | (2017.01) |
| *B33Y 40/10* | (2020.01) |
| *B29C 64/118* | (2017.01) |
| *B33Y 70/10* | (2020.01) |

(52) U.S. Cl.
CPC ......... *B29C 64/314* (2017.08); *B29C 64/118* (2017.08); *B29C 64/153* (2017.08); *B33Y 10/00* (2014.12); *B33Y 40/10* (2020.01); *B33Y 70/10* (2020.01)

(58) Field of Classification Search
CPC ... B29C 64/118; B29C 64/153; B29C 64/314; D01D 11/06; B33Y 10/00; B33Y 40/10; B33Y 70/10
See application file for complete search history.

(56) References Cited

U.S. PATENT DOCUMENTS

| | | | | |
|---|---|---|---|---|
| 6,200,732 | B1* | 3/2001 | Tamura | G03F 7/0037 560/205 |
| 8,414,784 | B1* | 4/2013 | Tsotsis | H01B 1/24 427/407.1 |
| 2010/0173070 | A1* | 7/2010 | Niu | B01D 39/086 427/304 |
| 2016/0067917 | A1* | 3/2016 | Hirata | B29C 64/35 106/190.1 |
| 2016/0083535 | A1 | 3/2016 | Wilenski et al. | |
| 2017/0298521 | A1* | 10/2017 | Demuth | B33Y 50/02 |
| 2018/0104741 | A1* | 4/2018 | Heinrichsdorf | B22F 1/16 |
| 2021/0237342 | A1* | 8/2021 | Bhatt | B29C 64/30 |
| 2022/0143913 | A1* | 5/2022 | De Backer | B29C 64/314 |

OTHER PUBLICATIONS

J. Gardan et al., Improving the Fracture Toughness of 3D Printed Thermoplastic Polymers by Fused Deposition Modeling, 2017, International Journal of Fracture 210(7), pp. 1-15.

* cited by examiner

*Primary Examiner* — Nahida Sultana
(74) *Attorney, Agent, or Firm* — McDonnell Boehnen Hulbert & Berghoff LLP (57) ABSTRACT

An example method for forming a strengthened additive manufacturing material includes coating a surface of an additive manufacturing material with a solution including reinforcement particles, and causing a solvent of the solution to evaporate and the reinforcement particles adhere to the surface of the additive manufacturing material. An example strengthened filament includes a polymer filament having a surface, and reinforcement particles included on the surface of the polymer filament in a substantially uniform coating.

20 Claims, 5 Drawing Sheets

METHODS FOR FORMING STRENGTHENED ADDITIVE MANUFACTURING MATERIALS AND STRENGTHENED FILAMENTS FOR USE

FIELD

The present disclosure relates to forming strengthened additive manufacturing materials, such as by coating a surface of an additive manufacturing material with a solution including reinforcement particles, and also to methods for additive manufacturing of parts using the strengthened additive manufacturing materials.

BACKGROUND

Additive Manufacturing (AM) refers to a process that produces complex geometries by layers manufacturing, and is sometimes referred to as three-dimensional (3D) printing. Various AM processes have been developed including fused filament fabrication (FFF), which is a layer additive manufacturing process that uses a thermoplastic filament of fused deposition to builds a part geometry along trajectories generated by slicing.

Parts that are made by methods such as FFF can have a lower fracture toughness than similar parts made by other traditional methods. For increased used of polymer AM parts for semi-structural applications, the toughness properties need to be improved.

Currently, to improve fracture toughness, parts are produced using specific deposition patterns that satisfy a certain stress criterion. The criterion requires that a direction of the filaments follow a principal direction of stress in the part. However, this method may not work well for complex shapes as principal stress directions may not be aligned to one particular direction.

SUMMARY

A method for forming a strengthened additive manufacturing material is described that comprises coating a surface of an additive manufacturing material with a solution including reinforcement particles, and causing a solvent of the solution to evaporate and the reinforcement particles adhere to the surface of the additive manufacturing material.

In another example, a method for additive manufacturing of parts is described that comprises inserting a coated filament into an additive manufacturing machine, and the coated filament including a polymer filament having a surface coated with a solution including reinforcement particles. The reinforcement particles are higher in density than the polymer filament. The method also comprises melting the coated filament into polymer beads, and the reinforcement particles move to an outer surface during melting. The method also comprises extruding the polymer beads through a printer nozzle to deposit the polymer beads and form a part having layers, and causing the reinforcement particles to be selectively deposited at weld lines between the layers of the part due to being a higher density than the polymer filament.

In another example, a strengthened filament is described comprising a polymer filament having a surface, and reinforcement particles included on the surface of the polymer filament in a substantially uniform coating.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings which are not necessarily drawn to scale, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Additive manufacturing (AM) provides an alternative to casting for manufacturing certain components, for example, to enable replacement parts to be produced more quickly and easily. Parts produced using additive manufacturing provide strength comparable to castings, but do not have as significant tooling requirements as castings.

In some instances, however, parts produced by AM techniques can have strength that is compromised due to interlayer weld lines created in the manufacturing process that provide a path for cracks to propagate. Within examples described herein, methods for forming a strengthened additive manufacturing material are described that include coating filaments with whiskers to improve fracture toughness on 3D printed parts. With this process, the whisker can be selectively deposited at interlayer boundaries because the whisker is applied on a surface of filament.

Within examples, the filament used in the fused filament fabrication (FFF) process is coated with powdered whiskers (inorganic or organic particles) that are capable of reflecting crack front. The whisker particles are adhered to the filament surface by dipping the filament in a solution of whiskers mixed with solvent. As the solvent evaporates, the whisker material will adhere to the surface of the filament and does not mix in with the bulk polymer.

Thus, using the examples described herein, methods for improving fracture toughness of 3D printed parts are described.

Figure 1:
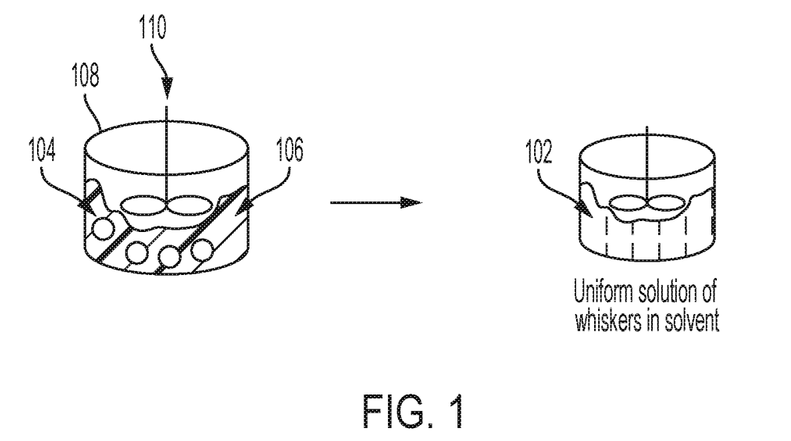
FIG. 1 illustrates an example of a process for forming a solution including reinforcement particles, according to an example implementation.

Referring now to the Figures, FIG. 1 illustrates an example of a process for forming a solution 102 including reinforcement particles 104, according to an example implementation. Initially, a solvent 106 and the reinforcement particles 104 are inserted into a chamber 108, and a mixer 110 is used to mix the solvent 106 and the reinforcement particles 104 together. After mixing, the solution 102 results in a uniform solution of the reinforcement particles 104 in the solvent 106.

The reinforcement particles 104 can be in powder form, for example, and may include whiskers or microcrystalline fibers. The reinforcement particles 104 may have an elongated shape. Example reinforcement particles as inorganic whiskers include one of silicon carbide, magnesium sulphate, potassium titanate, aluminum borate, or zinc oxide. Example reinforcement particles as organic whiskers include one of carbon nanotubes, thermoplastic particulates, or Kevlar®.

In addition, in some examples, the reinforcement particles 104 may be treated with a silane-based coupling agent or a titanate-based coupling agent for better adhesion properties. Example silane-based coupling agents include KH-550, A151, and ND-42.

The reinforcement particles 104 can have a length to diameter ratio of between about 10:1 to about 50:1. In practice, a higher ratio may provide improved performance to strengthen additive manufacturing materials.

The solvent 106 can include many types of solvents, such as Ethylene glycol, Ethylene glycol monoethyl ether, water, ethanol, and acetone, for example.

Following mixing, the solution 102 is a uniform solution that may have a concentration of the reinforcement particles 104 of between about 0.1% and about 60%. Other concentrations can be used depending on a desired strengthening to be provided to the additive manufacturing material. Other example concentrations include 10% to 20%, 10%-30%, 25%-50%, and 45%-60%. The concentration of reinforcement particles 104 may depend on a type of part to be manufactured, and when the part has many voids, a larger concentration of reinforcement particles 104 can be included to fill the voids, for example.

The concentration of reinforcement particles 104 in the solution 102 may also be optimized according to a type of the additive manufacturing material that is to be strengthened using the solution 102 as well as according to a type of the reinforcement particles 104, for example.

Figure 2:
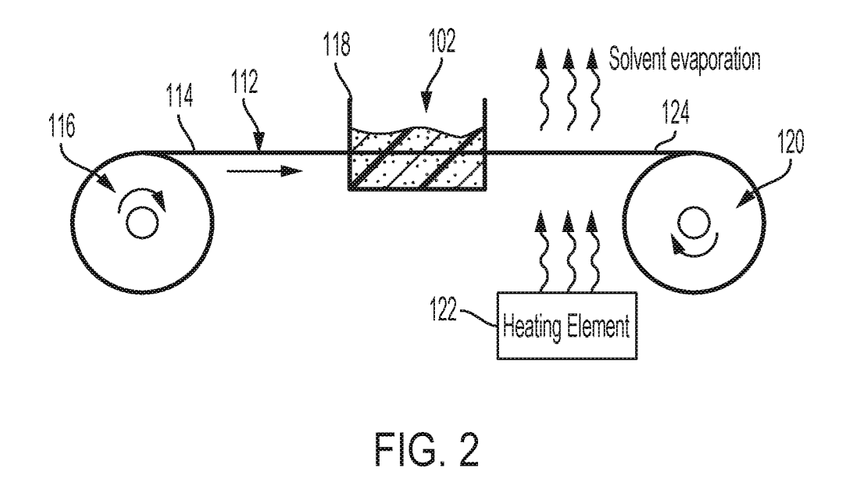
FIG. 2 illustrates an example of a process for forming a strengthened additive manufacturing material, according to an example implementation.

FIG. 2 illustrates an example of a process for forming a strengthened additive manufacturing material, according to an example implementation. Initially, a surface 112 of an additive manufacturing material 114 is coated with the solution 102 including the reinforcement particles 104, and then the solvent 106 of the solution 102 is caused to evaporate and the reinforcement particles 104 adhere to the surface 112 of the additive manufacturing material 114.

In FIG. 2, the additive manufacturing material 114 is shown as a polymer filament. For example, the polymer filament may be a nylon material about 1.75 mm in width. When using a polymer filament, the reinforcement particles 104 may include thermoplastic particulates, for example. The polymer filament may be provided on a first spool 116, and then the polymer filament is passed through the solution 102 causing the reinforcement particles 104 to adhere to the surface 112 of the polymer filament. For example, the polymer filament may be passed from the first spool 116 through a container 118 of the solution 102, and then the polymer filament is wound after passing through the container 118 of the solution 102 onto a second spool 120.

The coating of the surface 112 may result in a substantially uniform coating of the surface 112 of the polymer filament with the solution 102 including reinforcement particles 104. As an example, coating the surface 112 of the polymer filament with the solution 102 including the reinforcement particles 104 creates a layer on the surface 112 of the polymer filament of between about 5 μm to about 10 μm.

The solution 102 provides a benefit of facilitating adhesion of the reinforcement particles 104 to the surface 112 of the additive manufacturing material 114. Without the solution 102, the reinforcement particles 104 may not remain attached to the surface 112 at all.

Following coating, the solvent 106 evaporates and the reinforcement particles 104 adhere to the surface 112 of the additive manufacturing material 114. The solvent 106 can be evaporated at room temperature over about thirty minutes, for example. In some examples, to further increase evaporation, the additive manufacturing material 114 can be heated after coating the surface 112 of the additive manufacturing material 114, such as through use of a heating element 122.

After evaporation of the solvent, the reinforcement particles 104 remain and are adhered to the surface 112 of the additive manufacturing material 114. In an example where the additive manufacturing material is a polymer filament, this results in a strengthened filament 124 (or coated filament), for example. The strengthened filament then comprises a polymer filament having a surface, and reinforcement particles included on the surface of the polymer filament in a substantially uniform coating. The polymer filament prepared by this example method will have a rough surface texture due to the presence of the reinforcement particles.

In the example shown in FIG. 2, the additive manufacturing material 114 is passed through the container 118 of the solution 102 to apply the coating. In other examples, the solution 102 can be sprayed onto the surface 112 of the additive manufacturing material 114.

Figure 3A:
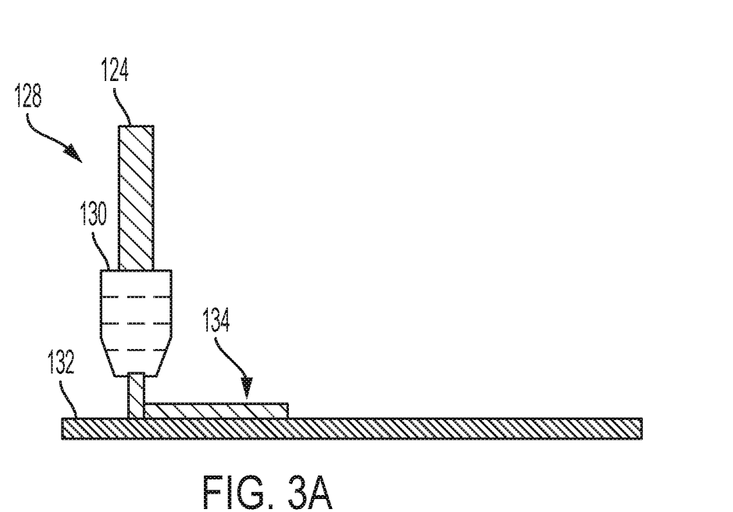
FIG. 3A illustrates an example process for manufacturing a part using additive manufacturing, and an input to the additive manufacturing is the strengthened filament (or coated filament), according to an example implementation.
Figure 3B:
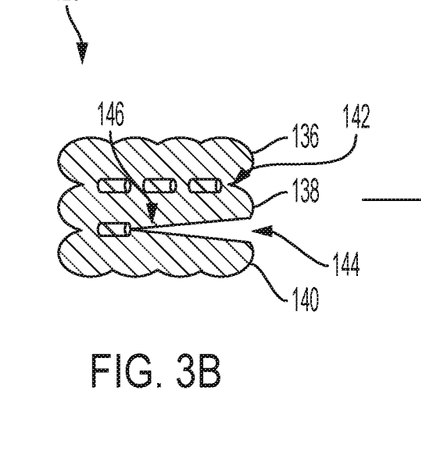
FIG. 3B illustrates an example of a crack that formed in the part between the layers, according to an example implementation.
Figure 3C:
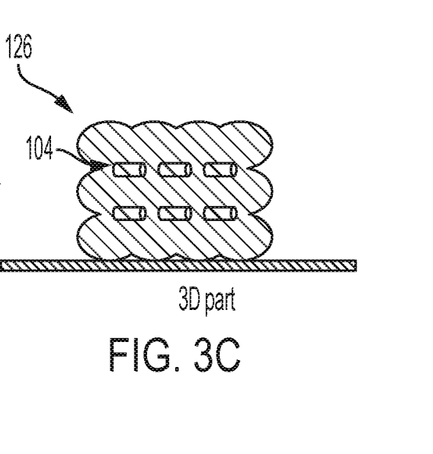
FIG. 3C illustrates an example of the final part following repair of the crack by the reinforcement particles, according to an example implementation.

FIGS. 3A-3C illustrate an example process for manufacturing a part 126 using additive manufacturing, and an input to the additive manufacturing is the strengthened filament 124 (or coated filament), according to an example implementation. As shown in FIG. 3A, initially, the strengthened filament 124 is inserted into an additive manufacturing machine 128. The additive manufacturing machine 128 may include many components, such as a printing head or printer nozzle 130, control mechanisms (e.g., computing device), molds, etc., depending on a type of manufacturing being used. A range of processes finding industrial applications for additive manufacturing includes direct metal deposition, electron beam melting, polymer processes such as fused filament fabrication (FFF), fused deposition (FDM), Solid Ground Curing (SGC), Laminated Object Manufacturing (LOM), and select laser sintering (SLS) or selective laser melting (SIM), among others. The additive manufacturing machine 128 may include components specific to any of these processes, or in some examples, the additive manufacturing machine 128 may include hybrid machine tools to combine additive manufacturing with subtractive machining.

Parts produced using additive manufacturing techniques are built up by laying down a layer of material on a build platform 132 layer-by-layer. This process provides properties comparable to that of a casting.

After inserting the strengthened filament 124 into the additive manufacturing machine 128, the additive manufacturing machine 128 melts the coated filament into polymer beads 134 for extrusion. The reinforcement particles 104 move to an outer surface during melting. Then, the printer nozzle 130 extrudes the polymer beads 134 to deposit the polymer beads 134 on the build platform and forms the part 126 having layers 136, 138, and 140.

The manufacturing process in this manner causes the reinforcement particles 104 to be selectively deposited at weld lines 142 and 144 between the layers 136, 138, and 140 of the part 126 due to being a higher density than the polymer filament, for example.

FIG. 3B illustrates an example of a crack 146 that formed in the part 126 between the layers 138 and 140, which is stopped due to the presence of the reinforcement particles 104 at the weld line 144, for example.

FIG. 3C then illustrates an example of the part 126 following repair of the crack 146 by the reinforcement particles 104.

Thus, as the part 126 is 3D printed, the strengthened filament 124 is extruded through the printer nozzle 130, which selectively deposits the whiskers at areas susceptible to cracking causing interlayer bonds to occur. Then, if a crack forms and tries to propagate, the whiskers coating will deflect or resist propagation of the crack due to the improved fracture toughness and flexural properties of the 3D printed part between the layers. This results in an improved fracture toughness of the 3D printed part by coating the polymer filament with whiskers or microcrystalline fibers.

Generally, fracture toughness of parts made by additive manufacturing methods, such as FFF, is typically lower than that of the part made by traditional methods. Much of the problem results from the presence of the weld lines in the 3D printed part that provide a continuous path for the cracks to propagate. However, using the example improvements described herein, the strengthened filament 124 is capable of reflecting crack growth.

The strengthened filament 124 further differs from existing additive manufacturing materials in that the reinforcement particles 104 will move to an outer surface during melting and extrusion, rather than remaining internal to the filament or being present in a bulk of the filament. Because the reinforcement particles 104 move to the outer surface, due to being a higher density than the polymer filament for example, the reinforcement particles 104 will be present at the inter-layer bonds in the part 126 as the part 126 is being made, and presence of the reinforcement particles 104 at the inter-layer boundaries mitigates propagation of cracks along the weld lines in the part 126. Thus, the reinforcement particles 104 should be sufficiently heavy so that during deposition of the strengthened filament 124, the reinforcement particles 104 stay at the interface and do not mix in with the bulk polymer.

Figure 4:
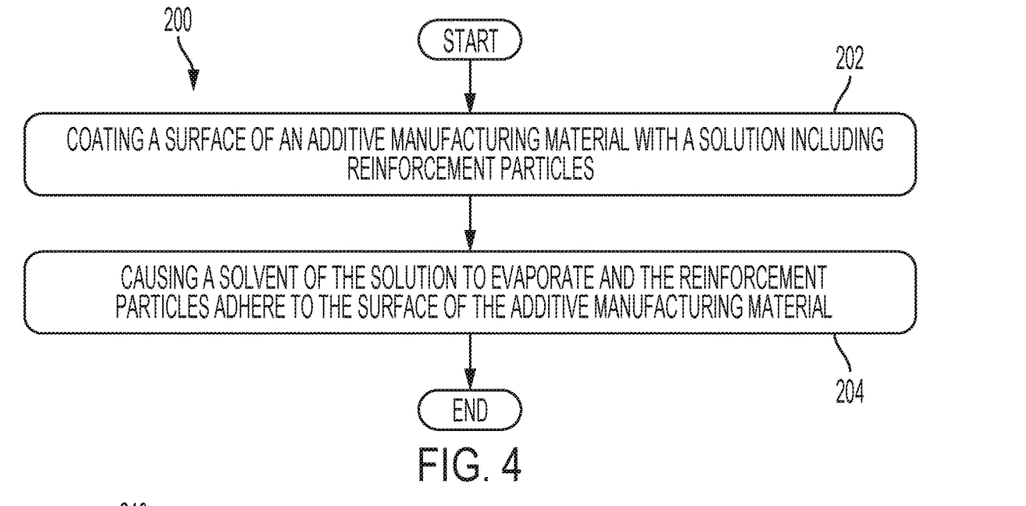
FIG. 4 shows a flowchart of an example of a method for forming a strengthened additive manufacturing material, according to an example implementation.

FIG. 4 shows a flowchart of an example of a method 200 for forming a strengthened additive manufacturing material, according to an example implementation. Method 200 shown in FIG. 4 presents an example of a method that could be used with the additive manufacturing machine 128 shown in FIG. 3 or with components of the additive manufacturing machine 128, for example. Further, devices or systems may be used or configured to perform logical functions presented in FIG. 4. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-204. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes coating a surface 112 of an additive manufacturing material 114 with a solution 102 including reinforcement particles 104. Within examples, block 202 includes coating the surface 112 of the additive manufacturing material 114 with the solution 102 including whiskers or microcrystalline fibers.

In some examples, block 202 includes coating the surface of a polymer filament. This may include passing the polymer filament through the solution 102 causing the reinforcement particles 104 to adhere to the surface of the polymer filament. For example, this can include passing the polymer filament from the first spool through a container of the solution, and winding the polymer filament after passing through the container of the solution onto a second spool.

Within examples, block 202 includes substantially uniformly coating the surface 112 of the polymer filament with the solution 102 including reinforcement particles 104. Such coating can create a layer on the surface of the polymer filament of between about 5 µm to about 10 µm. Such thicknesses may match voids present during 3D part manufacturing, as described below.

Within examples, block 202 can include coating the surface of the additive manufacturing material 114 with the solution 102 including reinforcement particles 104 as inorganic whiskers including one of silicon carbide, magnesium sulphate, potassium titanate, aluminum borate, or zinc oxide. Within other examples, block 202 can include coating the surface 112 of the additive manufacturing material 114 with the solution 102 including reinforcement particles 104 as organic whiskers including one of carbon nanotubes, thermoplastic particulates, or Kevlar.

Within examples, block 202 can include coating the surface 112 of the additive manufacturing material 114 with the solution 102 including reinforcement particles 104 treated with a silane-based coupling agent or a titanate-based coupling agent.

Additionally, block 202 can include coating the surface 112 of the additive manufacturing material 114 with the solution 102 having a concentration of reinforcement particles 104 of between about 0.1% and about 60%. Such coating can also include using reinforcement particles 104 with a length to diameter ratio of between about 10:1 to about 50:1.

At block 204, the method 200 includes causing a solvent 106 of the solution 102 to evaporate and the reinforcement particles 104 adhere to the surface 112 of the additive manufacturing material 114.

Within an example, causing the solvent 106 of the solution 102 to evaporate and the reinforcement particles 104 adhere to the surface 112 of the polymer filament results in a coated filament, and the method 200 can additionally include manufacturing a part using additive manufacturing, and an input to the additive manufacturing is the coated filament.

In some examples, the method 200 can additionally include heating the additive manufacturing material 114 after coating the surface 112 of the additive manufacturing material 114 with the solution 102 including reinforcement particles 104 to cause the solvent 106 of the solution 102 to evaporate.

Furthermore, in examples where the reinforcement particles 104 are in powder form, the method 200 may further include mixing the reinforcement particles 104 in the solvent 106.

Figure 5:
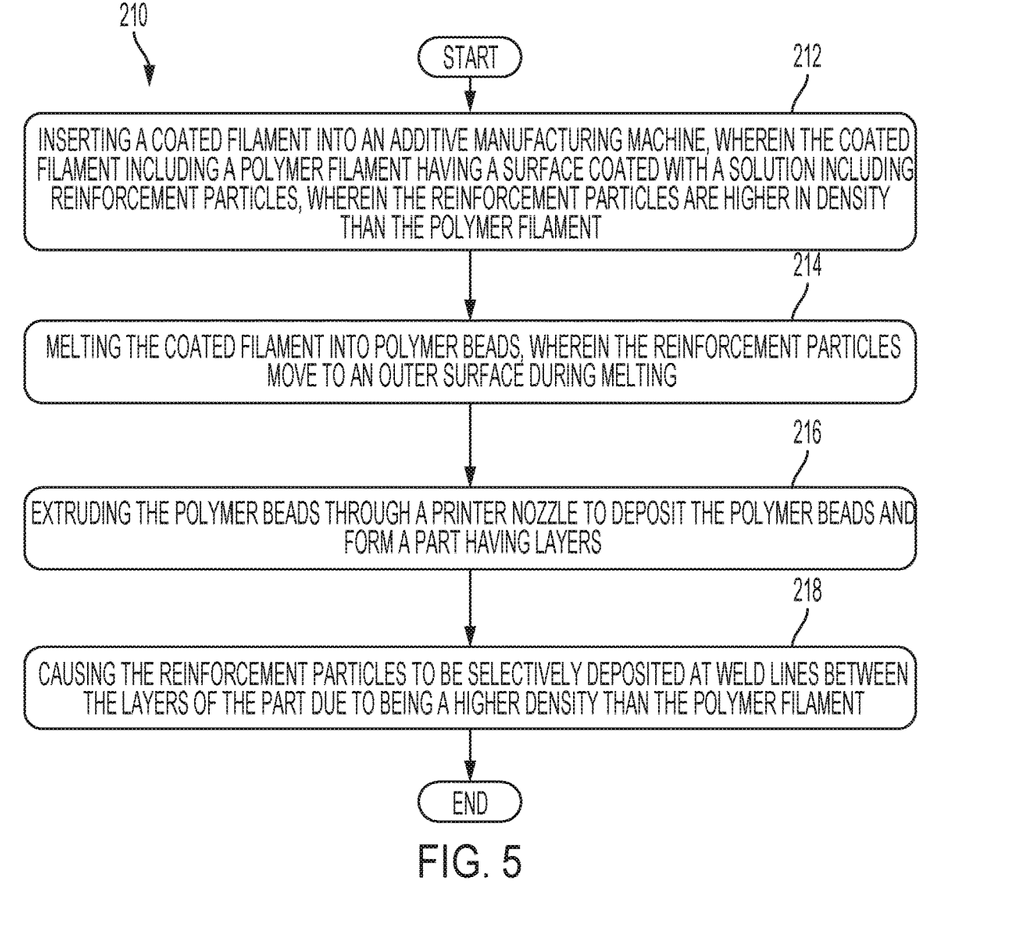
FIG. 5 shows a flowchart of an example of a method for additive manufacturing of parts, according to an example implementation.

FIG. 5 shows a flowchart of an example of a method 210 for additive manufacturing of parts, according to an example implementation. Method 210 shown in FIG. 5 presents an example of a method that could be used with the additive manufacturing machine 128 shown in FIG. 3 or with components of the additive manufacturing machine 128, for example. Further, devices or systems may be used or configured to perform logical functions presented in FIG. 5. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 210 may include one or more operations, functions, or actions as illustrated by one or more of blocks 212-218. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 212, the method 210 includes inserting a coated filament 124 into an additive manufacturing machine 128, and the coated filament 124 includes a polymer filament having a surface 112 coated with a solution 102 including reinforcement particles 104. The reinforcement particles 104 are higher in density than the polymer filament.

At block 214, the method 210 includes melting the coated filament 124 into polymer beads 134, and the reinforcement particles 104 move to an outer surface during melting.

At block 216, the method 210 includes extruding the polymer beads 134 through a printer nozzle 130 to deposit the polymer beads 134 and form a part 126 having layers.

At block 218, the method 210 includes causing the reinforcement particles 104 to be selectively deposited at weld lines 142 and 144 between the layers 136, 138, and 140 of the part 126 due to being a higher density than the polymer filament.

Figure 6:
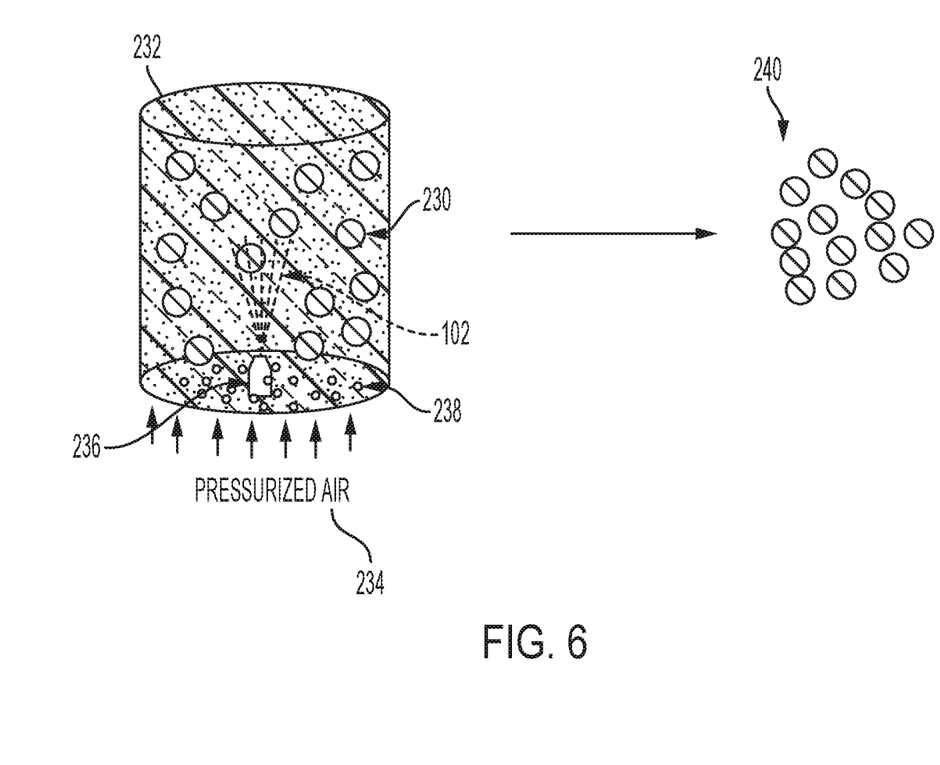
FIG. 6 illustrates an example of another process for forming a strengthened additive manufacturing material, according to an example implementation.

FIG. 6 illustrates an example of another process for forming a strengthened additive manufacturing material, according to an example implementation. In FIG. 6, the additive manufacturing material is in powder form, such as additive manufacturing powder particles 230. In this example, surfaces of the additive manufacturing powder particles 230 can be coated by inserting the additive manufacturing powder particles 230 into a chamber 232, and spraying the solution 102 inside the chamber 232 using pressurized air 234. The chamber 232 may have a nozzle 236 for spraying the solution 102 (with the reinforcement particles) inside the chamber 232, and the pressurized air 234 is provided through perforations 238 of a bottom surface of the chamber 232 to distributed the solution 102 substantially throughout an interior of the chamber 232. Doing so coats all the additive manufacturing powder particles 230 substantially evenly on an exterior surface of the additive manufacturing powder particles 230.

Following, the solvent 106 of the solution 102 evaporates and the reinforcement particles 104 adhere to the surface of the additive manufacturing powder particles 230 resulting in coated powder particles 240.

Figure 7A:
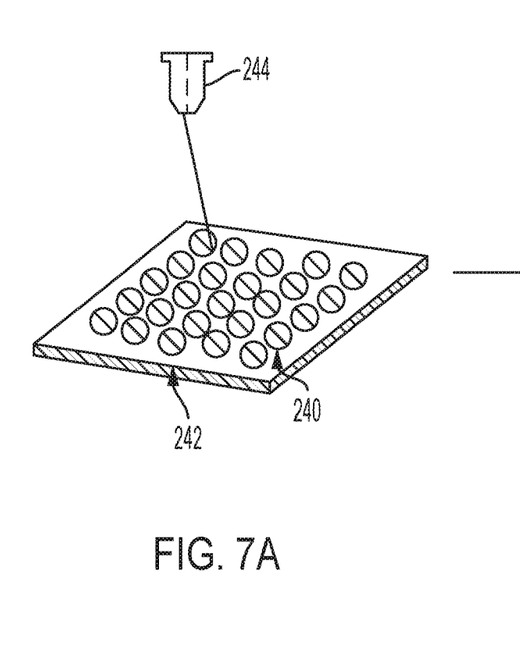
FIG. 7A illustrates an example process for manufacturing a part using additive manufacturing, and an input to the additive manufacturing is the coated powder particles, according to an example implementation.
Figure 7B:
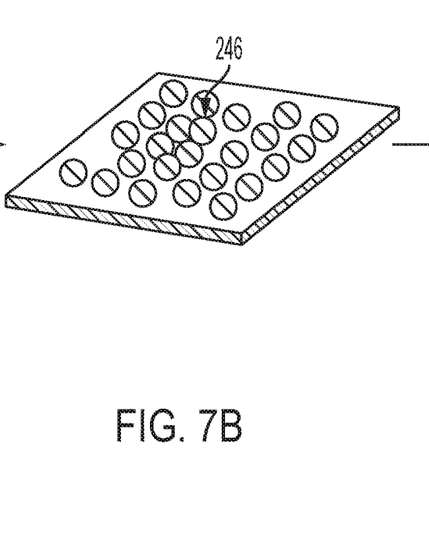
FIG. 7B illustrates an example of sintered powder particles that result from the application of the laser radiation, according to an example implementation.
Figure 7C:
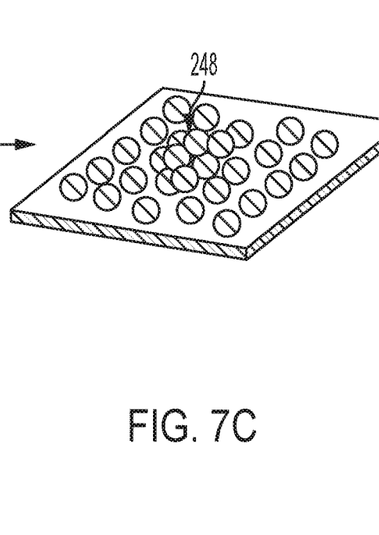
FIG. 7C illustrates an example of multi-layer sintered particles, according to an example implementation.

FIGS. 7A-7C illustrate an example process for manufacturing a part 126 using additive manufacturing, and an input to the additive manufacturing is the coated powder particles 240, according to an example implementation. The process shown in FIGS. 7A-7C include manufacturing the part using laser sintering of the coated powder particles 240. For example, as shown in FIG. 7A, the coated powder particles 240 are spread on a base plate 242 and laser radiation is applied on selected points to melt the coated powder particles 240 using a laser device 244.

FIG. 7B illustrates an example of sintered powder particles 246 that result from the application of the laser radiation.

Following, the process is repeated to spread another layer of the coated powder particles 240 and the laser radiation is selectively applied. FIG. 7C illustrates an example of multi-layer sintered particles 248.

Within examples described herein, fracture toughness and shear strength of parts manufactured using additive manufacturing are improved. This enables new applications of composite AM parts to be used to replace some metal parts, and thus, provide light-weight alternatives, for example, within aerospace, automotive, and industrial original equipment manufacturer (OEM) industries.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for forming a strengthened additive manufacturing material, the method comprising:
   treating reinforcement particles with a silane-based coupling agent or a titanate-based coupling agent to increase adhesion properties of the reinforcement particles;
   coating a surface of an additive manufacturing material with a solution including the reinforcement particles; and
   causing a solvent of the solution to evaporate and the reinforcement particles adhere to the surface of the additive manufacturing material.

2. The method of claim 1, wherein coating the surface of the additive manufacturing material with the solution including reinforcement particles comprises coating the surface of the additive manufacturing material with the solution including whiskers or microcrystalline fibers.

3. The method of claim 1, wherein coating the surface of the additive manufacturing material comprises coating the surface of a polymer filament.

4. The method of claim 3, wherein coating the surface of the polymer filament comprises passing the polymer filament through the solution causing the reinforcement particles to adhere to the surface of the polymer filament.

5. The method of claim 3, wherein the polymer filament is on a first spool, and wherein coating the surface of the polymer filament with the solution including reinforcement particles comprises:
   passing the polymer filament from the first spool through a container of the solution; and
   winding the polymer filament after passing through the container of the solution onto a second spool.

6. The method of claim 3, wherein coating the surface of the polymer filament with the solution including reinforcement particles comprises substantially uniformly coating the surface of the polymer filament with the solution including reinforcement particles.

7. The method of claim 3, wherein coating the surface of the polymer filament with the solution including reinforcement particles comprises coating the surface of the polymer filament with the solution including reinforcement particles to create a layer on the surface of the polymer filament of between about 5 μm to about 10 μm.

8. The method of claim 3, wherein causing the solvent of the solution to evaporate and the reinforcement particles adhere to the surface of the polymer filament results in a coated filament.

9. The method of claim 1, wherein coating the surface of the additive manufacturing material with the solution including reinforcement particles comprises coating the surface of the additive manufacturing material with the solution including reinforcement particles as inorganic whiskers including one of silicon carbide, magnesium sulphate, potassium titanate, aluminum borate, or zinc oxide.

10. The method of claim 1, wherein coating the surface of the additive manufacturing material with the solution including reinforcement particles comprises coating the surface of the additive manufacturing material with the solution including reinforcement particles as organic whiskers including one of carbon nanotubes, thermoplastic particulates, or Kevlar.

11. The method of claim 1, wherein coating the surface of the additive manufacturing material with the solution including reinforcement particles comprises coating the surface of the additive manufacturing material with the solution having a concentration of reinforcement particles of between about 0.1% and about 60%.

12. The method of claim 1, wherein coating the surface of the additive manufacturing material with the solution including reinforcement particles comprises coating the surface of the additive manufacturing material with the solution having reinforcement particles with a length to diameter ratio of between about 10:1 to about 50:1.

13. The method of claim 1, further comprising:
   heating the additive manufacturing material after coating the surface of the additive manufacturing material with the solution including reinforcement particles to cause the solvent of the solution to evaporate.

14. The method of claim 1, wherein the reinforcement particles are in powder form, and the method further comprises:
   mixing the reinforcement particles in the solvent.

15. The method of claim 1, wherein coating the surface of the additive manufacturing material comprises coating surfaces of additive manufacturing powder particles.

16. The method of claim 15, wherein coating surfaces of additive manufacturing powder particles comprises:
   inserting the additive manufacturing powder particles into a chamber; and
   spraying the solution inside the chamber using pressurized air.

17. The method of claim 15, wherein causing the solvent of the solution to evaporate and the reinforcement particles adhere to the surface of the additive manufacturing powder particles results in coated powder particles.

18. A method for additive manufacturing of parts, the method comprising:
   inserting a coated filament into an additive manufacturing machine, wherein the coated filament including a polymer filament having a surface coated with a solution including reinforcement particles, wherein the reinforcement particles are treated with a silane-based coupling agent or a titanate-based coupling agent to increase adhesion properties of the reinforcement particles, and wherein the reinforcement particles are higher in density than the polymer filament;

melting the coated filament into polymer beads, wherein the reinforcement particles move to an outer surface during melting;

extruding the polymer beads through a printer nozzle to deposit the polymer beads and form a part having layers; and causing the reinforcement particles to be selectively deposited at weld lines between the layers of the part due to being a higher density than the polymer filament.

19. The method of claim 1, wherein a concentration of reinforcement particles in the solution depends on a type of part to be manufactured using the additive manufacturing material.

20. The method of claim 1, wherein a concentration of reinforcement particles in the solution depends on a type of the additive manufacturing material.

\* \* \* \* \*